UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DERIVATIVE OF OXYARYLARSINIC ACIDS AND PROCESS OF MAKING SAME.

986,148. Specification of Letters Patent. Patented Mar. 7, 1911.

No Drawing. Application filed May 9, 1910. Serial No. 560,271. (Specimens.)

*To all whom it may concern:*

Be it known that we, PAUL EHRLICH, M. D., professor of medicine, and ALFRED BERTHEIM, Ph. D., citizens of the Empire of Germany, residing at Frankfort-on-the-Main, Germany, have invented certain new and useful Improvements in New Derivatives of the Oxyarylarsinic Acids and Process of Making Same, of which the following is a specification.

We have found that the aminoöxy-arsenobenzene derivatives, obtainable from nitro derivatives of the oxyarylarsinic acids by reduction, are valuable products, as they are a specific therapeutic agent for curing syphilis and febris recurrens. The said new aminoöxy derivatives of arsenobenzene are yellow powders which are insoluble or difficultly soluble in water and the usual organic solvents; they melt with decomposition and dissolve in alkalis as well as in dilute mineral acids forming salts; their alkaline solution is altered on exposure to the air. The process may, for instance, be illustrated by the following equation:

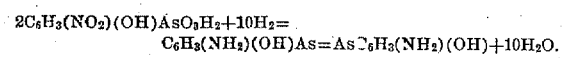

For therapeutical purposes they may be administered, for instance, by injecting subcutaneously 0.3 g. of the sodium salt of diaminodioxyarsenobenzene.

The procedure for preparing the new compounds may, for instance, be as follows: 144 g. of sodium para-oxyphenylarsinate, dried at 80° C., are introduced by portions into 450 ccm. of concentrated sulfuric acid at 0° C. while well stirring. Into this mass a mixture of 39 ccm. of nitric acid (specific gravity 1.4) and 39 ccm. of concentrated sulfuric acid is poured by drops, while continuing the stirring, taking care that the temperature does not rise over 0° C. The stirring is continued and the temperature allowed to rise to about 10° C. After some hours, the mass is poured into 2250 ccm. of water and the nitroöxyphenylarsinic acid which crystallizes slowly from the solution may be filtered off. It forms a yellowish-white crystalline powder. This nitroöxyphenylarsinic acid is pretty readily soluble in hot water, but difficultly soluble in cold water, readily soluble in alcohol, acetone or glacial acetic acid. Its alkaline salts, which are readily soluble in water, are of a high-yellow color; it decomposes when heated. 66 g. of nitroöxyphenylarsinic acid are dissolved in 1320 ccm. of water and 225 ccm. of caustic soda lye of twice the normal strength and then introduced into a solution of 855 g. of anhydrous sodium hydrosulfite and 171 g. of crystallized magnesium chlorid in 4275 ccm. of water. The magnesium chlorid is added for the purpose of keeping neutral the reaction of the solution, as this gives the most advantageous condition in the process. On digesting the solution at 50° C., a light-yellow, microcrystalline precipitate separates which consists of the diaminodioxyarsenobenzene. Its separation is completed by gently heating for some time. When filtered off and dried, the new compound forms a yellow powder which is soluble in dilute hydrochloric acid and in caustic soda lye and carbonate of soda; from such an alkaline solution is may be again separated by an addition of acetic acid. The diaminodioxyarsenobenzene is nearly insoluble in water and the usual organic solvents such as alcohol, ether, benzene; it decomposes when heated at about 165° C. Its dihydrochlorid, which may be precipitated from a methyl-alcoholic solution by ether, is a light yellow powder, readily soluble in water and methyl-alcohol, scarcely soluble in ethyl-alcohol, insoluble in ether or benzene; it decomposes when heated at about 190° C. In an analogous manner there may, for instance, be produced from dinitrooxyphenylarsinic acid the tetraminodioxyarsenobenzene and from nitro-orthocresolarsinic acid the diaminodioxyarsenotoluene, which compounds possess properties similar to those of the diaminodioxyarsenobenzene.

Having now particularly described our invention, what we claim is:

1. As new products, aminoöxyarsenobenzenes, being derivatives of the para-para-dioxyarsenobenzene, which are yellow powders insoluble or difficultly soluble in water and the usual organic solvents, melting with decomposition, and forming with alkalis or dilute mineral acids soluble salts.

2. As a new product, diaminodioxyarsenobenzene, being a yellow powder, insoluble in water, alcohol, ether and benzene, readily dissolving in caustic soda lye and dilute hydrochloric acid, and decomposing when heated to about 165° C.; said product being, in the form of its dihydrochlorid, a light yellow powder, readily soluble in water and methyl-alcohol, scarcely soluble in ethyl-alcohol, insoluble in ether or benzene; and decomposing when heated at about 190° C.

3. The process of manufacturing new arsenical remedies, which consists in treating nitroöxyarylarsinic acids with a strong reducing agent, as hereinbefore described.

4. The process of manufacturing new arsenical remedies, which consists in treating nitro-para-oxyphenylarsinic acid with a strong reducing agent, as hereinbefore described.

5. The process of manufacturing new arsenical remedies, which consists in treating nitro-para-oxyphenylarsinic acid with a hydrosulfite, as hereinbefore described.

In testimony whereof, we affix our signatures in presence of two witnesses.

PAUL EHRLICH.
ALFRED BERTHEIM.

Witnesses:
　JEAN GRUND,
　CARL GRUND.